United States Patent [19]
Efron et al.

[11] Patent Number: 5,227,886
[45] Date of Patent: Jul. 13, 1993

[54] OPTICAL IMAGING/DISPLAY CCD LIGHT VALVE AND METHOD

[75] Inventors: Uzi Efron; William Byles, both of Los Angeles, Calif.

[73] Assignee: Hughes Aircraft Company, Los Angeles, Calif.

[21] Appl. No.: 657,719

[22] Filed: Feb. 19, 1991

[51] Int. Cl.$^5$ .................... G02F 1/13; H04N 3/00
[52] U.S. Cl. .................... 358/209; 359/84; 359/72; 250/331; 250/332; 358/230
[58] Field of Search .................... 359/84, 85, 72, 41; 250/331, 332; 358/209, 230

[56] References Cited

U.S. PATENT DOCUMENTS

| | | |
|---|---|---|
| 4,169,231 | 9/1979 | Nash et al. |
| 4,191,452 | 3/1980 | Grinberg et al. |
| 4,198,647 | 4/1980 | Grinberg et al. |
| 4,227,201 | 10/1980 | Grinberg et al. |
| 4,319,239 | 3/1982 | Stephens |
| 4,443,064 | 4/1984 | Grinberg et al. |
| 5,076,670 | 12/1991 | Sayyah .................... 359/72 |
| 5,081,542 | 1/1992 | Efron et al. .................... 359/72 X |

OTHER PUBLICATIONS

M. S. Welkowsky et al., "Status of the Hughes Charge-Coupled-Device-Addressed Liquid Crystal Light Valve", Optical Engineering, vol. 26, No. 5, pp. 414-417, May 1987.

Efron et al., "A Submicron Metal Grid Mirror Liquid Crystal Light Valve for Optical Processing Applications", SPIE, vol. 1151, 1989, pp. 591-606.

"Charge-Coupled Devices and Their Applications", McGraw-Hill Book Company (UK) Limited, Eds.: J. D. E. Beynon and D. R. Lamb, pp. 105-108.

Primary Examiner—James J. Groody
Assistant Examiner—Mark R. Powell
Attorney, Agent, or Firm—V. D. Duraiswamy; W. K. Denson-Low

[57] ABSTRACT

A combined optical imaging/display device employs a liquid crystal light valve (LCLV) with a charge coupled device (CCD) input, and a photosensitive CCD or charge injection device (CID) array for receiving an input image and developing a corresponding signal pattern. The signal pattern is applied as an input to the CCD after amplifying it and manipulating it as desired. The CCD and photosensitive array are provided on a common substrate; their cells may be arranged in alternating rows or in separate arrays. The invention is applicable to active vision enhancement goggles.

43 Claims, 4 Drawing Sheets

OPTICAL IMAGING/DISPLAY CCD LIGHT VALVE AND METHOD

BACKGROUND OF THE INVENTION

1. Field of the Invention

This invention relates to miniature optical display devices, and more particularly to charge coupled device (CCD) liquid crystal light valves (LCLVs).

2. Description of the Related Art

There is a need for miniature vision enhancement devices that is not presently being satisfied. Applications for such a device include use in goggles for the vision impaired, and helmet-mounted miniature displays for night use.

Presently available "night scope" goggles are on the order of three to four inches thick, which is uncomfortably big and deters people from using them. Such goggles require a 180° rotation of the image, performed by optical fibers that add about an inch to the overall goggle thickness.

Existing technologies for image display also have relatively large geometries, typically with apertures extending over several cms, and cannot be easily adapted to the miniaturization required in devices for the vision impaired. One problem of vision impairment involves localized blind spots on the retina. It would be desirable to distort and redirect an incoming image away from the blind spots and onto the functioning areas of the retina, but existing goggles do not have an image processing capability; they merely detect and display images.

A miniature optical display device known as a charge coupled device (CCD) liquid crystal light valve (LCLV) has been developed recently, but it does not have an imaging capability. It is described for example in Welkowsky et. al., "Status of the Hughes Charge-Coupled-Device-Addressed Liquid Crystal Light Valve", *Optical Engineering*, Vol. 26, No. 5, pages 414–417, May 1987. In this type of device, shown in FIGS. 1 and 2, a CCD integrated circuit 2 is fabricated on one side of a semiconductor wafer 4, generally silicon, and is used to supply a spatially resolved signal to a light valve structure on the other side of the wafer. The CCD circuits convert a serial input voltage signal into sampled charge packets and distribute them onto a regular two-dimensional array, which may typically be 256×256 pixels with present configurations. A readout structure 6 transports the charge information from the wafer's epitaxial layer, upon which the CCD is formed, to the opposite side of the wafer while retaining the spatial resolution of the charge packets. A mirror, such as dielectric mirror 8, is provided between the readout structure and a liquid crystal cell 10. A transparent electrode 12, generally of indium tin oxide (ITO), is formed on the other side of the liquid crystal cell and is capped with a glass coverplate 14.

A bias voltage from voltage source 16 is applied across the readout structure and electrode 12. To avoid deterioration of the liquid crystals, an alternating bias is used. The readout structure in effect serves as a spatial voltage divider, causing the bias voltage to be applied across the liquid crystal cell in proportion to the CCD signal for each pixel. A readout light beam 18 is directed through the liquid crystal cell to the mirror, which reflects a high percentage of the readout light while greatly attenuating the non-reflected portion to prevent activation of the silicon substrate, which is photosensitive. The electro-optic liquid crystal converts the amount of charge in each of the CCD packets into a proportional amount of spatial modulation of the readout light.

A cross-section of the light valve which shows the readout structure is given in FIG. 2. This structure consists of a high resistivity silicon substrate 20, a microdiode focusing grid 22, a guard ring diode 24, and an MOS gate oxide layer 26 with the microdiodes 22 on one side and the dielectric mirror 8 on the other side. The CCD gate electrodes 28 are formed on an $SiO_2$ layer 30, which in turn overlies the p-type epitaxial layer 32. The CCD buckets 34 are defined in the epitaxial layer by the CCD gate electrodes 28 and by CCD epitaxial layer channel stops 36.

The dielectric mirror 8 is composed of multiple alternating pairs of ¼ wavelength Si and $SiO_2$ layers, tuned to the wavelength of the incident readout light. The liquid crystal in cell 10, which performs the electro-optic modulation, is generally twisted nematic. The readout light is polarized in a plane of polarization that is rotated in direct proportion to the amount of signal charge in each pixel which activates the liquid crystal. Thus, a spatially resolved pattern of polarization modulation is introduced onto the reflected readout light, which may then be converted into an intensity-modulated output image by the use of a downstream polarizer in a 90° analyzer optical configuration.

The CCD circuits themselves are symbolically represented in FIG. 3. They convert a serial electrical input voltage signal into a two-dimensional parallel array of charge packets using a four-phase clocking design. A serial input signal is entered through an input amplifier 38 into a serial input register 40, in which the charge samples are clocked one cell at a time to the right. When the serial input register 40 is full, clocking of charge stops and each of the charge samples is simultaneously shifted into a serial-to-parallel transfer structure 42. Upon completion of the transfer, the CCD begins clocking a new line of information into the serial register 40. While this new line is being clocked into place, the line of charge packets in the transfer structure 42 is shifted down by one line into the CCD parallel array 44 to accept the next line of charge packet information. This process continues (unless commanded to stop) until the entire parallel array CCD is filled.

When all shifting of charge has been completed and the CCD array is full, each line of charge is held under corresponding lines of gates in the parallel array. The voltage on these gates is slowly reduced to release all of the charge packets, which diffuse through the epitaxial layer to be transported to the opposite side of the silicon chip by the readout structure. If desired, a serial output register 46 and output amplifier 48 may be used to clock out from the CCD lines of charge packets that are not transmitted through the epitaxial layer.

The CCD-LCLV was developed for use as an input device in coherent optical data processing systems. Its serial electrical input allows it to form a precise optical display. However, it is not designed to receive and process an input optical image. The use of a CCD-addressed LCLV as an imager device was demonstrated in 1987, and is described in Efron et. al., "A Submicron Metal Grid Mirror Liquid Crystal Light Valve for Optical Processing Applications", SPIE, Vol. 1151, 1989, pages 591–606, and particularly page 595. In this application, the CCD was used in an inverse mode.

The silicon substrate was biased into depletion, and an incident beam with a wavelength of 730 nm was partially transmitted from the readout side of the device through a leaky dielectric mirror (the mirror was tuned to the 450-650 nm spectral region). An image charge pattern was generated in the silicon and clocked in reverse, resulting in the generation of a sequential time-dependent signal at the output of the CCD's serial input register; this signal was converted into a video format to produce an image. This reverse mode operation did not produce an image directly from the CCD-LCLV, but rather only an electrical signal pattern that was converted into an image via additional video apparatus.

U.S. Pat. No. 4,227,201, "CCD Readout Structure for Display Applications", J. Grinberg et. al., issued Oct. 7, 1980 and assigned to Hughes Aircraft Company, the assignee of the present invention, discloses a liquid crystal light valve (LCLV) which uses the transfer of charge carriers representing a plurality of signals from a CCD array to a liquid crystal light modulated display medium. An interface structure for the storage and transfer of input data from a CCD array to a LCLV is described.

U.S. Pat. No. 4,319,239, "CCD Capacitance Modulation Matrix for Liquid Crystal Displays", C. P. Stephens, issued Mar. 9, 1982, and assigned to Hughes Aircraft Company, the assignee of the present invention, teaches controlling the optical response of a liquid crystal layer by an applied a.c. electric field having its amplitude in selected regions of the liquid crystal modulated by charge stored in an underlying charge transfer device. The necessity for an intrinsic substrate and the necessity for a d.c. electric field is eliminated because the charge packets stored by the CCD do not leave the CCD channel, but instead remain stationary while modulating the depletion capacitance beneath selected overlying regions of the liquid crystal display.

U.S. Pat. No. 4,198,647, "High Resolution Continuously Substituted Silicon Photodiode Substrate", J. Grinberg et. al., issued Apr. 15, 1980, assigned to Hughes Aircraft Company, the present assignee, discloses a semiconductor apparatus for the transfer of charge from one surface of a semiconductor substrate to the opposite surface through the use of a charge depletion region while maintaining their spatial resolution.

U.S. Pat. No. 4,191,452, "AC Silicon PN Junction Photodiode Light Valve Substrate", issued Mar. 4, 1980, assigned to Hughes Aircraft Company, the present assignee, discloses a single crystal silicon charge storage apparatus suitable for use in an alternating current driven LCLV having a PIN photodiode structure. The disclosed apparatus includes a structure which can be photoactivated or receive signal representing charge carriers from a CCD or any other source and convert these charge carriers into an AC signal that will activate the liquid crystal layer.

U.S. Pat. No. 4,169,231, "Buried Channel to Surface Channel CCD Charge Transfer Structure", J. G. Nash et. al., issued Sep. 25, 1979, also assigned to surface channel charge coupled device suitable for use in the present invention for high bandwidth imaging.

U.S. Pat. No. 4,443,064, "High Resolution AC Silicon MOS-Light Valve Substrate", J. Grinberg et. al., issued Apr. 17, 1984, assigned to Hughes Aircraft Company, the present assignee, discloses a CCD driven LCLV and an MOS capacitor type structure for the storage and transfer of photogenerated minority carrier representing signals to an alternating current driven LCLV.

SUMMARY OF THE INVENTION

The present invention seeks to provide a CCD-addressed LCLV that can act as both an imaging and display device, and yet. allows for electronic manipulation of the input image. This type of device could be integrated into goggles for the vision impaired that are considerably smaller, and therefore more likely to be used, than prior goggles.

These goals are achieved by using a photosensing CCD array or alternately a charge injection device (CID), which is closely related to a CCD, to receive an input image and develop a corresponding electrical signal pattern. The signal pattern is applied as an input to the CCD-LCLV, and used to modulate the LCLV.

In a preferred embodiment, the LCLV and photosensor are provided on a common substrate, which includes circuitry for amplifying and if desired otherwise manipulating the signal pattern prior to applying it to the CCD. Charge signals corresponding to the received image are developed in the photoelement cells, and transferred to corresponding cells of the CCD. In one embodiment the photoelement cells are arranged in alternating rows with the CCD, while in another embodiment the CCD and photoelement cells are arranged in respective arrays on separate portions of the substrate.

Serial output and serial input registers may be provided at opposite ends of the CCD rows, and connected by a CCD transfer channel. Charge packets transferred from the photoelements are circulated through the CCD serial output register, transfer channel and serial input register back to the individual CCD cells. During this transfer process the charge signals can be amplified and otherwise manipulated, and externally generated image patterns can also be applied to the CCD.

These and further features and advantages of the invention will be apparent to those skilled in the art from the following detailed description, taken together with the accompanying drawings, in which:

DETAILED DESCRIPTION OF THE INVENTION

Figure 1:
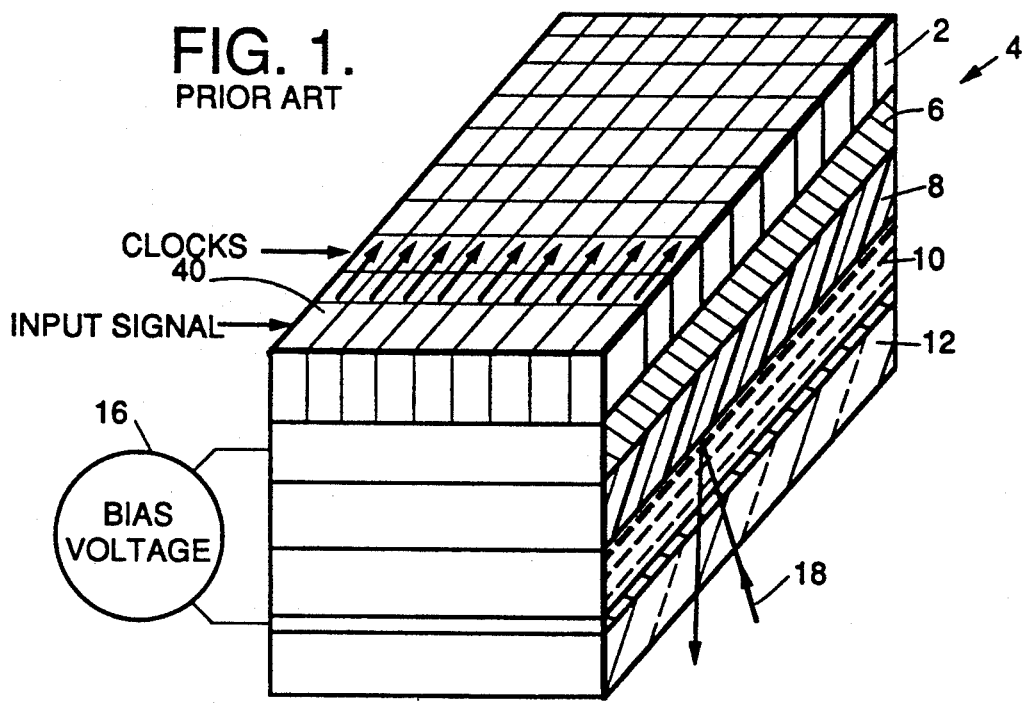
FIGS. 1, 2 and 3 are respectively a perspective view, a cross-sectional view and an operational diagram of a prior CCD-LCLV, discussed above.
Figure 2:
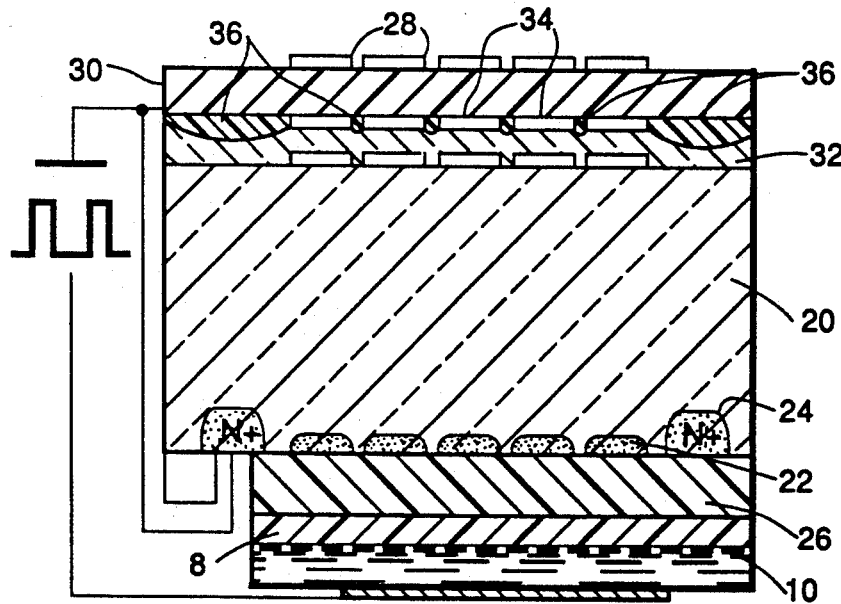
Figure 3:
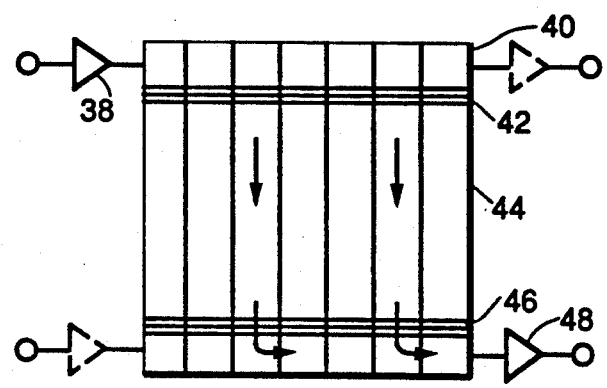
Figure 4:
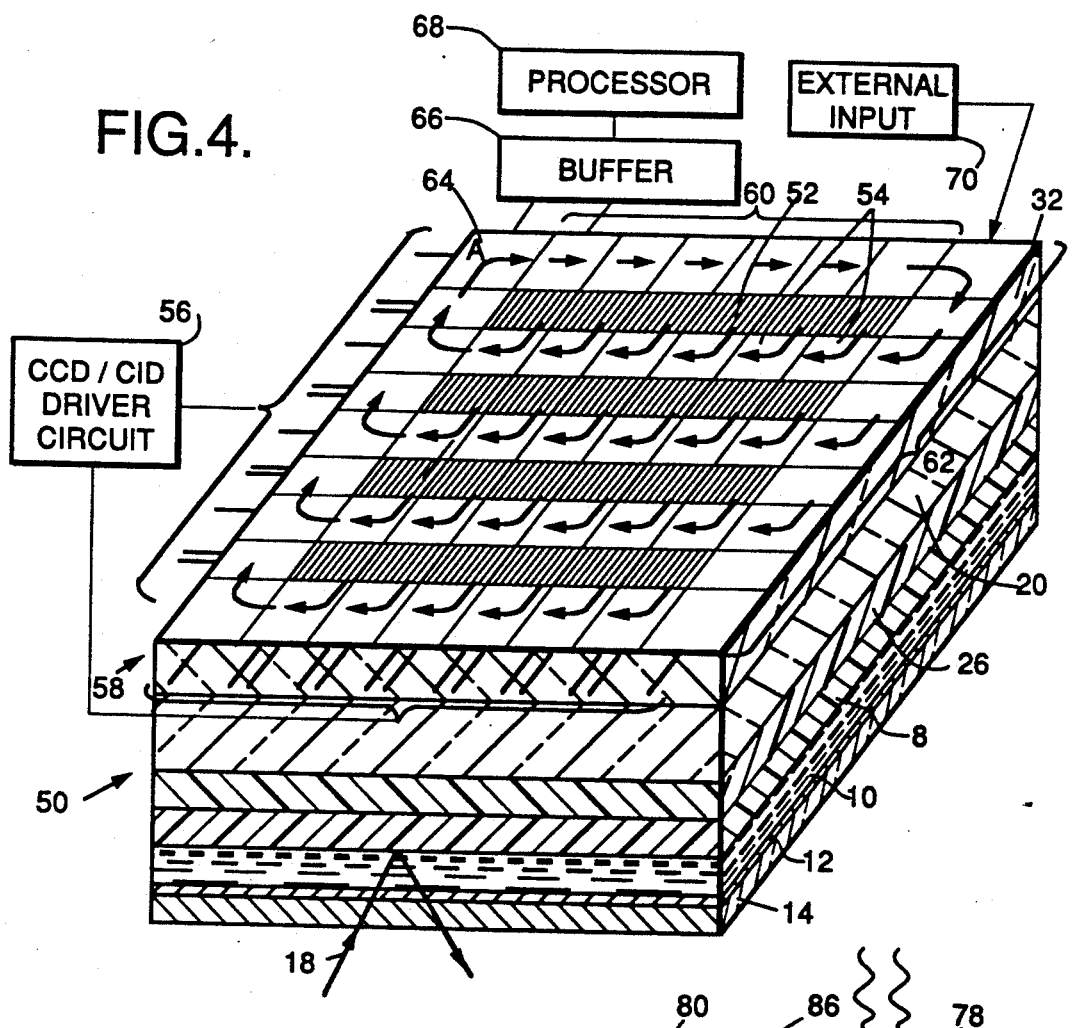
FIG. 4 is a perspective view of a sectioned imaging-/display device constructed in accordance with the invention.

A perspective view of one embodiment of the invention is shown in FIG. 4. This drawing is considerably simplified, showing only a 4×6 pixel device, whereas current practical devices could have 256×256, 512×512 or even 1,024×1,024 arrays.

A charge injection device photoelement array is formed on the same side of a silicon substrate 50 as a CCD. A photoelement (PE) is an MOS metal oxide semiconductor device that collects charge generated by photoactivation. Electron-hole pairs are generated when the semiconductor of the PE is illuminated, with charge stored in the epitaxial layer below the PE gates. The PE array may be implemented as either a CID or a CCD. The PE pixels 52 in FIG. 4 are indicated by cross-hatching, while the CCD pixels 54 are unshaded. The PE pixels are preferably larger than the CCD pixels to capture a greater portion of the input image.

The PEs are organized into lines of cells or pixels which alternate with the CCD pixel lines, such that the PEs and CCD are intermixed and share an area on the face of the substrate. When the wafer is illuminated by an input image, charge is generated in the PE cells and stored in the epitaxial layer below the gate for each cell. The charge in each PE cell 52 is then clocked out to an adjacent CCD cell 54, under the control of CCD driver circuitry 56. A matrix of bus lines connects the driver circuitry to the various CCD cells. The charge string in each line of CCD cells is clocked into a parallel serial output register 58 at one end of the array. Clock drivers that may be used for experimental and development purposes are provided by Pulse Instruments Company, and designated model PI-454 for high speed clocks and PI-451 for slow speed clocks; each unit drives one clock line through a coaxial cable. Their relatively large size and adjustment requirements, however, make these units not as desirable for commercial applications. A standard clock driver implemented in a single chip that can be used for commercial units is manufactured by several companies, such as the National Semiconductor DS0026. Also, the current widespread use of CCD chips for cameras and document scanners has led to the development of special driver chips that are specifically designed for their particular applications—a CID/CCD clock driver for the present invention could similarly be custom designed.

As each line of charge packets is clocked into the serial output register 58, the previous line is circulated via a transfer channel 60 into a serial input register 62, which re-distributes the charge string into a CCD line array. The charge packets are then clocked back into their original CCD cells, from whence the charge pattern is released from the CCD gates and drifts through the thin epitaxial layer 32 into the high resistivity silicon layer 20. The remainder of the structure is a typical LCLV, with an $SiO_2$ layer 26, a dielectric or metal matrix mirror 8, a liquid crystal cell 10, a counterelectrode 12 and a face plate 14. A bias voltage (not shown) would also be applied across the readout structure and liquid crystal cell.

The application of a spatial voltage pattern across the liquid crystal layer results in a spatial birefringence modulation on the liquid crystal. A readout beam 18, such as from a light emitting diode, may then be used to illuminate the liquid crystal and acquire a modulation to form an image through an appropriate eyepiece over the observer's eyes.

During their circulation through the CID/CCD structure, the charge packets are amplified to enhance the display quality. An on-chip charge amplifier can be used to produce a gain of up to the order of $10^6$, or perhaps even higher. Such an amplifier may conveniently be implemented in the corner pixel 64 between the serial output register 58 and the CCD transfer channel 60. It can consist of a simple one or two field effect transistor (FET) amplifier integrated directly into the CCD structure, with its output routed back to the input of the CCD.

The charge data can be manipulated as desired to spatially rearrange the pixel charges, such as a 180° rotation of the image for viewing through goggles or image distortion to shift the image away from blind spots on the user's retina. This manipulation may be accomplished by diverting the pixel charges, preferably after amplification, to a buffer 66 that may be implemented on-chip. A signal processor 68 operates upon the charge signals held in the buffer to manipulate them as desired. The buffer preferably has a capacity sufficient to hold a large number of lines, permitting the order of the lines in the final display to be reversed, for example, in a 180° rotation. After processing, the charge signals are returned to any convenient point in the charge circulation path for re-introduction into the CCD pixel locations. Furthermore, signals from an external input 70 may be introduced into the CCD array in lieu of, or in addition to, the internally generated image signals. For example, an externally generated grid could be superimposed upon the image, or desired areas of the image could be highlighted.

In the alternate embodiment mentioned above, a CID rather than a CCD array is used as the imaging element. A typical CID layout is shown schematically in FIG. 5. Cell addressing is accomplished with an x-y coincident voltage technique, similar to that used in digital memory designs. While readout from earlier CIDs was accomplished by injecting the charge from individual cells into the substrate and detecting the resultant displacement current, more recent readout schemes detect the charge by sensing capacitance variations on the electrodes that comprise the storage elements.

Figure 5:
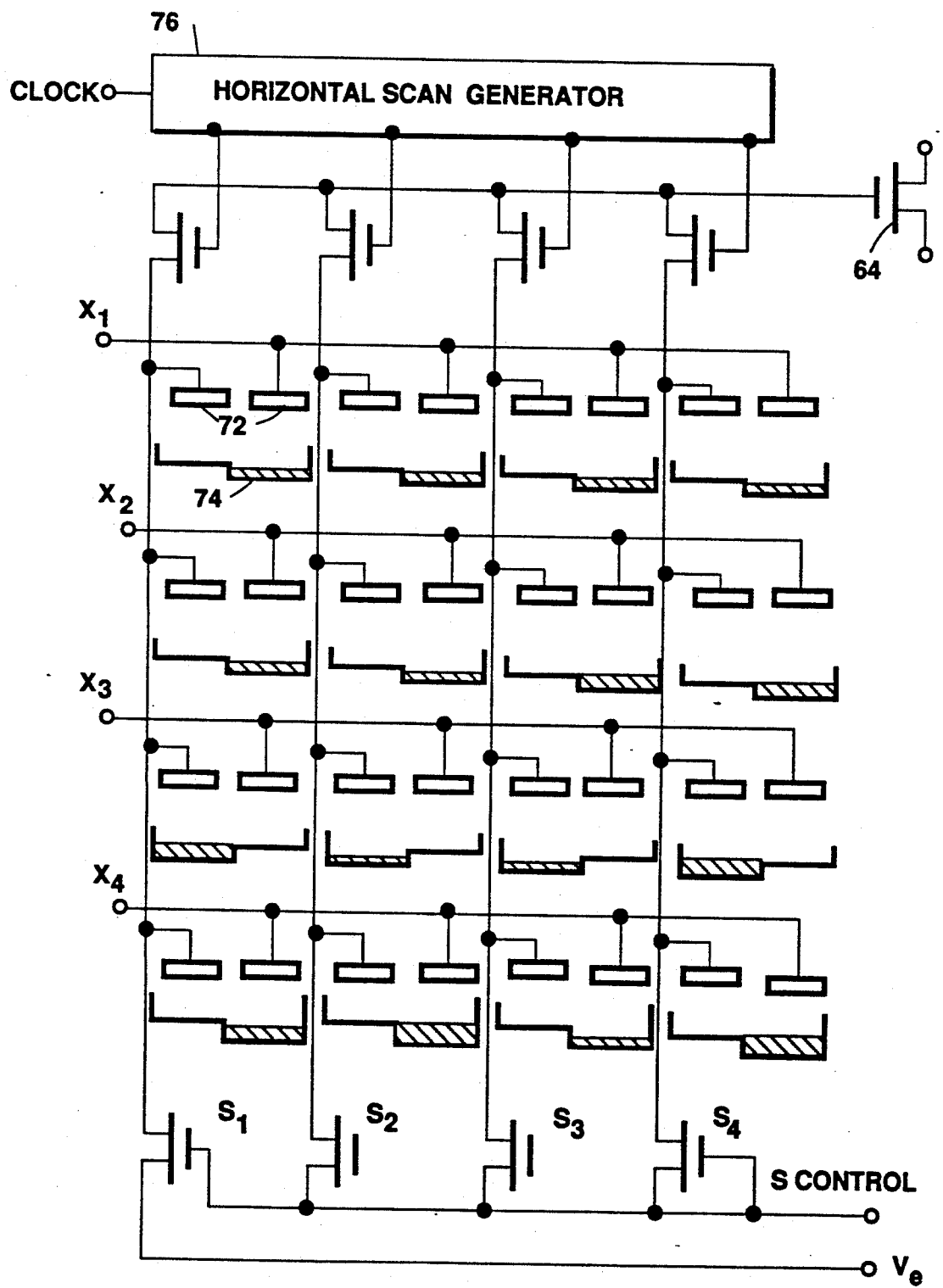
FIG. 5 is an energy diagram illustrating the operation of a CID which provides an imaging function for the new device.

A simplified array of $4 \times 4$ elements (pixels) is shown in FIG. 5, with the relevant silicon surface potentials and signal charge locations displayed. Horizontal and vertical scan registers are implemented onchip, using conventional MOS circuit techniques. Each cell includes a pair of electrodes 72 that are either overlapping or coupled by means of a diffusion in the silicon, so that charge may transfer between them. As long as one of the two electrodes is at a high potential, a potential well exists in the element and photogenerated charge can be stored. Charge storage, indicated by hatched lining 74, under either electrode is possible, with transfer between the two effected by charge coupling. Since in operation the charge transfers back and forth at each imaging cell, charge left behind on one transfer is re-collected on the next, so that a high transfer efficiency is not required. When both electrodes are taken to zero bias simultaneously, the potential wells collapse and the charges are injected into the substrate, where they recombine with majority carriers.

Readout from the CID is controlled by a horizontal scan generator 76. At the beginning of a line scan all rows have voltage applied, and the column lines are reset to a reference voltage by means of column switches S1–S4 and then allowed to float. The voltage is removed from the row selected for readout (row X3 in FIG. 5), causing the signal charge for all cells in that row to transfer to the column electrodes. The voltage applied to the row electrodes is larger than that on the column electrodes, thus preventing the signal charge which is stored at unaddressed locations from effecting the column lines. The voltage on each column line then changes by an amount equal to the signal charge divided by the column capacitance. All column voltages are scanned by the horizontal scanning register, and transferred to the amplifier transistor 64.

At the end of each line scan, all signal charges in the selected row can be injected into the substrate simultaneously by driving all column voltages to zero via switches S1–S4. This parallel-injection approach permits high-speed readout, with the epitaxial junction acting as a buried collector "sink" for the injected charge.

Figure 6:
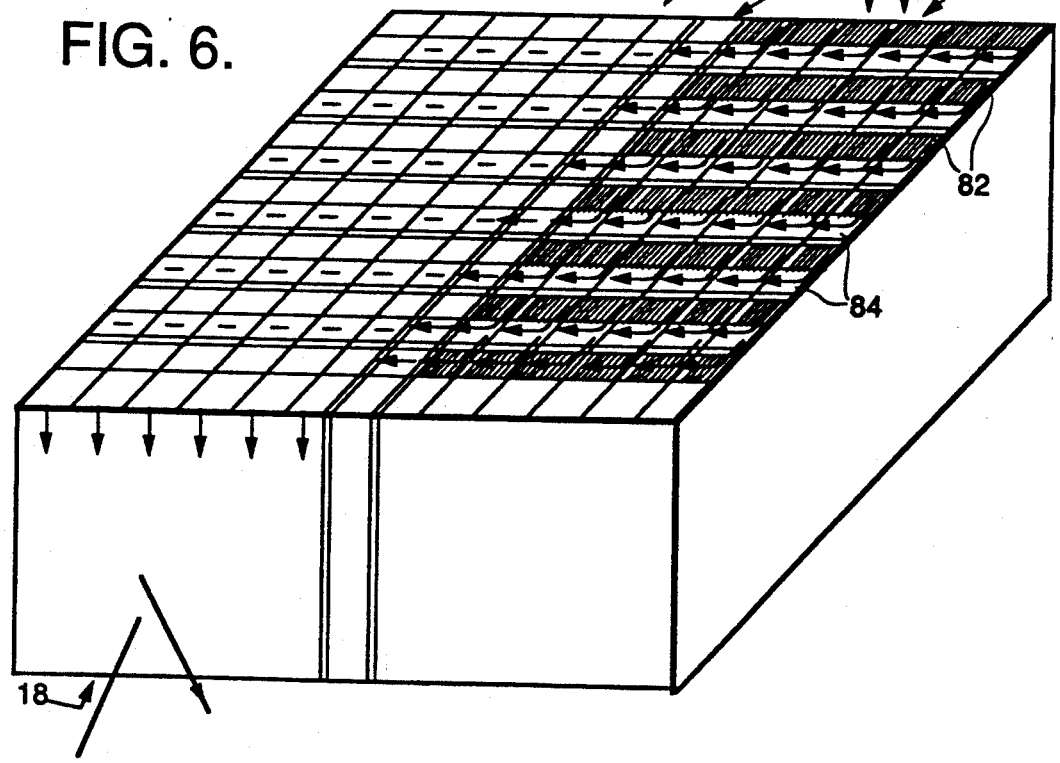
FIG. 6 is a perspective view of another embodiment of a combined imaging/display device.

Another embodiment of the invention is illustrated in FIG. 6. In this approach, the PE (CCD or CID) array 78 is located on a separate portion of the chip from the CCD display array. An input image is detected by the rows 82 of PE pixels, with the corresponding charge signals clocked out to output registers 84. The signals are then serially clocked into corresponding cells in the CCD array, through a linear amplifier array 86 that amplifies each charge signal in succession. Once an entire PE array of signals has been entered into the CCD, the charges are released through the silicon substrate in a conventional manner to modulate a readout beam 18.

Figure 7:
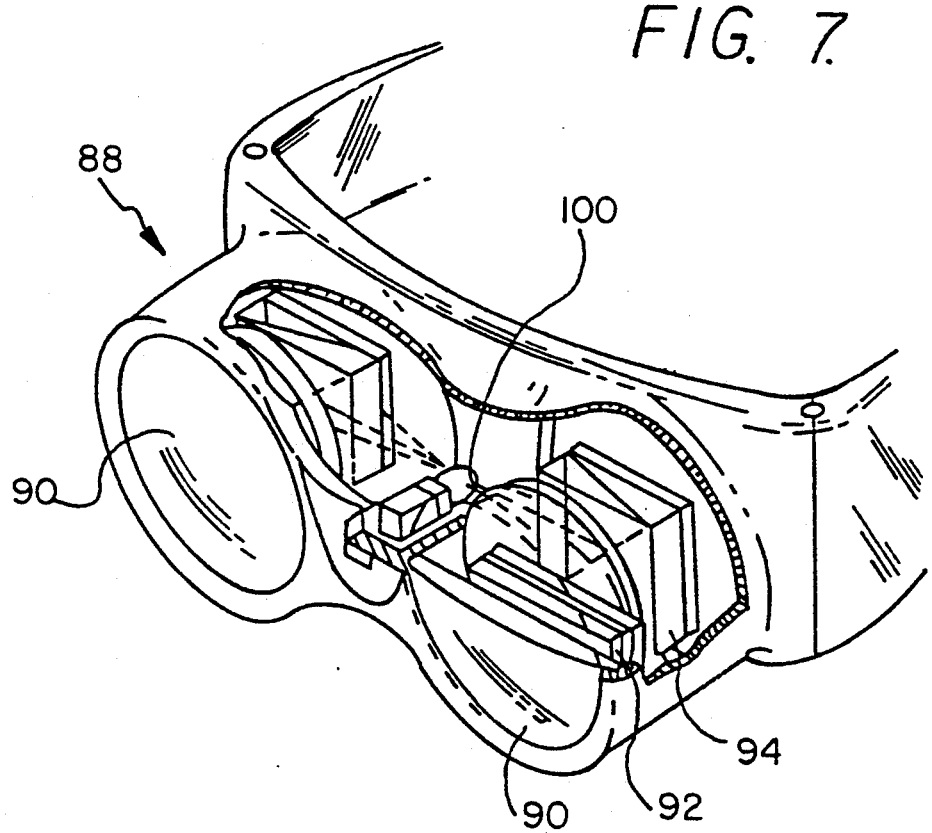
FIGS. 7 and 8 are respectively perspective and sectional views of a pair of vision enhancement goggles that use the invention.
Figure 8:
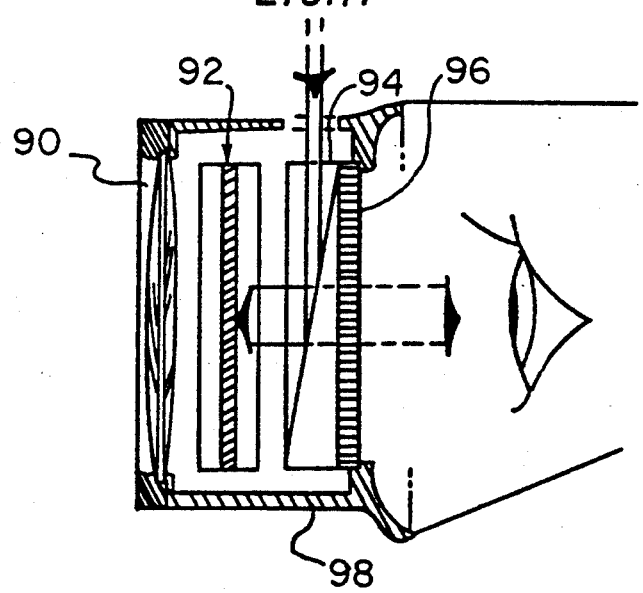

The invention is particularly applicable to vision enhancement goggles, such as those shown in FIGS. 7 and 8. The general construction of such goggles, but without the CID/CCD imaging-display capability of the present invention, is discussed in U.S. Pat. application Ser. No. 07/450,118, filed Dec. 12, 1989 by Efron et. al., "Liquid Crystal Light Valve Goggles for Eye Protection", and assigned to Hughes Aircraft Company, the assignee of the present invention. The goggles 88 include left and right objective lenses 90, a pair of CID/ CCD-addressed LCLVs 92 behind the lenses, a pair of polarizing beam splitters 94 behind the LCLVs, with eyepiece lenses 96 on the rear of the polarizing beam splitters. These elements are held together in a frame 98. A light emitting diode (LED) 100 or other suitable light source is mounted within the frame between the left and right eyepieces. Light from the LED is applied as a readout beam onto the viewing surfaces of the light valves by the polarizing beam splitters 94. To reduce power consumption, ambient light may be used during daytime by opening windows in the upper portion of the goggles to replace the LED operation; the LED would then be used when the ambient light is at a low level.

In operation, the objective lenses 90 focus the input image onto the PE light valve pixels. The charge packets thus developed are transferred to corresponding CCD cells as described above, from which an entire image frame is released at one time to the liquid crystal layers to modulate the readout beams. The spatially resolved voltages across the liquid crystal layers induce a phase change of the readout light, thereby replicating the input image on the viewing side of the light valves. The on-chip amplification capability provides a very distinct image, which can be manipulated as described above to purposely distort, rotate, enlarge or otherwise process the image. Furthermore, the new goggles can have the flexibility of either directly imaging an ambient scene in real time, or inserting video information by directly addressing the readout portion of the CCD device as described above.

While several illustrative embodiments of the invention have been shown and described, numerous variations and alternate embodiments will occur to those skilled in the art. Such variations and alternate embodiments are contemplated, and can be made without departing from spirit and scope of the invention as defined in the appended claims.

We claim:

1. A combined optical imaging/display device, comprising:
   a liquid crystal light valve (LCLV) having a charge coupled device (CCD) input,
   an array of photoelements (PEs) for receiving an input image and developing a corresponding signal pattern, and
   means for applying said signal pattern as an input to said CCD for modulating the LCLV.

2. The optical imaging/display device of claim 1, further comprising means for amplifying said signal pattern prior to applying it to said CCD.

3. The optical imaging/display device of claim 1, wherein said CCD and PE array are provided on a common substrate.

4. The optical imaging/display device of claim 3, said CCD and PE array each comprising multi-cell devices, with the CCD and PE cells arranged in alternating rows on said substrate.

5. The optical imaging/display device of claim 3, said CCD and PE array each comprising multi-cell devices, with the CCD and PE array cells arranged in respective arrays on separate portions of said substrate.

6. The optical imaging/display device of claim 1, further comprising means for manipulating said signal pattern prior to applying it as an input to said CCD.

7. The optical imaging/display device of claim 1, further comprising means for applying an externally generated image signal pattern to said CCD for modulating the LCLV.

8. The optical imaging/display device of claim 1, said PE array comprising a charge injection device or a CCD.

9. A combined optical imaging/display device, comprising:
   a liquid crystal light valve (LCLV) having a multicell charge coupled device (CCD) array on an input substrate, and means for modulating a readout beam in accordance with the charges held by the cells of said CCD array,
   a multicell photoelement PE array on said input substrate for receiving an input image and developing a charge pattern on its cells in response thereto,
   means for transferring charge signals from said PE cells to corresponding CCD cells, and
   means for releasing a charge pattern from said CCD cells for modulation of a readout beam applied to said LCLV.

10. The optical imaging/display device of claim 9, wherein said CCD and PE cells are arranged in alternating rows on said substrate.

11. The optical imaging/display device of claim 10, wherein said charge signal transferring means transfers charge from each row of PE cells to the CCD cells of an adjacent CCD row.

12. The optical imaging/display device of claim 11, wherein serial output and input registers are provided at respective opposite ends of said CCD rows, said input and output registers are connected by a CCD transfer channel, and said charge transferring means transfers charge signals from said CCD cells successively to said serial output register, transfer channel, serial input register, and back to said CCD cells.

13. The optical imaging/display device of claim 12, further comprising means located in said CCD transfer channel for amplifying said charge signals.

14. The optical imaging/display device of claim 12, further comprising means for rearranging the cell positions of said charge signals during the transfer of said signals.

15. The optical imaging/display device of claim 14, wherein said means for rearranging said cell positions comprise means for rotating the cell positions by 180°.

16. The optical imaging/display device of claim 9, further comprising means for applying an externally generated image signal pattern to said CCD for modulating the LCLV.

17. The optical imaging/display device of claim 9, said PE array comprising a charge injection device or a CCD.

18. The optical imaging/display device of claim 9, wherein said CCD and PE cells are arranged in respective arrays on separate portions of said substrate.

19. The optical imaging/display device of claim 18, wherein said CCD and PE cells are arranged in mutually parallel rows on their respective arrays, and charge transfer channels are provided adjacent each PE row for transferring charge signals held by the PE cells of said row to corresponding CCD cells in a corresponding CCD row.

20. The optical imaging/display device of claim 19, further comprising means located in said charge transfer channels between said CCD and PE arrays for amplifying said charge signals.

21. The optical imaging display device of claim 9, further comprising means for amplifying said charge signals prior to loading into said CCD cells.

22. The optical imaging/display device of claim 21, said amplifying means including means for varying the degree of amplification in accordance with the position of the cell whose charge signal is being amplified.

23. The optical imaging/display device of claim 9, wherein an equal number of CCD and PE cells are provided, with each CCD cell corresponding to a respective PE cell.

24. The optical imaging/display device of claim 9, wherein said PE cells are larger in area than said CCD cells.

25. A method of imaging and displaying an optical image, comprising:
receiving said image with a multi-cell photo-element (PE) array and developing charge signals in said PE cells in response thereto,
transferring the charge signals in the PE cells to corresponding cells of a closely proximate multi-cell charge coupled device (CCD), and
forming a display based upon the pattern of charge signals held by said CCD.

26. The method of claim 25, further comprising the step of amplifying said charge signals during said transfer.

27. The method of claim 26, wherein the amplification of the charge signal for each CCD cell is varied in accordance with the position of said cell.

28. The method of claim 25, said CCD comprising the input to a liquid crystal light valve (LCLV), wherein said display is formed by releasing the pattern of charge signals held by the CCD into the LCLV and reading out said pattern from the LCLV with an optical readout beam.

29. The method of claim 25, wherein the charge signals in said PE cells are initially transferred to corresponding CCD cells, and said charge signals are then circulated out of and back to said CCD cells.

30. The method of claim 29, wherein said charge signals are amplified during said charge circulation.

31. The method of claim 25, further comprising the step of manipulating said charge signals prior to transferring them to said CCD.

32. The method of claim 25, further comprising the step of applying an externally generated image signal pattern to said CCD.

33. The method of claim 25, wherein said PE and CCD cells are arranged in separate arrays.

34. The method of claim 25, said PE array comprising a charge injection device or a CCD.

35. Compact imaging/display goggles, comprising:
a liquid crystal light valve (LCLV) having a charge coupled device (CCD) input,
a photoelement (PE) array for receiving an input image and developing a corresponding signal pattern,
means for applying said signal pattern as an input to said CCD for modulating the LCLV,
means for supporting the LCLV for viewing thereof, and
optical means for reading out the LCLV to a viewer.

36. The goggles of claim 35, wherein said LCLV and PE array are provided on a common substrate.

37. The goggles of claim 36, said LCLV and PE array each comprising multi-cell devices, with the LCLV and PE cells arranged in alternating rows on said substrate.

38. The goggles of claim 36, said LCLV and PE array each comprising multi-cell devices, with the LCLV and CID cells arranged in respective arrays on separate portions of said substrate.

39. The goggles of claim 35, further comprising means for amplifying said signal pattern prior to applying it to said CCD.

40. The goggles of claim 35, further comprising means for manipulating said signal pattern prior to applying it as an input to said CCD.

41. The goggles of claim 40, said manipulating means comprising means for rotating the signal pattern by 180°.

42. The goggles of claim 35, further comprising means for applying an externally generated image signal pattern to said CCD for modulating said LCLV.

43. The goggles of claim 35, said PE array comprising a charge injection device or a CCD.

* * * * *